US012650709B2

(12) United States Patent
Lu et al.

(10) Patent No.: US 12,650,709 B2
(45) Date of Patent: Jun. 9, 2026

(54) TOUCH MONITOR CAPABLE OF ENHANCING TOUCH FEEDBACK

(71) Applicant: EMERGING DISPLAY TECHNOLOGIES CORP., Kaohsiung City (TW)

(72) Inventors: Chih Hung Lu, Hualien County (TW); Yong Ming Chen, Kaohsiung City (TW); Cheng Tsung Yang, Kaohsiung City (TW)

(73) Assignee: EMERGING DISPLAY TECHNOLOGIES CORP., Kaohsiung City (TW)

( * ) Notice: Subject to any disclaimer, the term of this patent is extended or adjusted under 35 U.S.C. 154(b) by 0 days.

(21) Appl. No.: 19/025,303

(22) Filed: Jan. 16, 2025

(65) Prior Publication Data

US 2026/0044185 A1 Feb. 12, 2026

(30) Foreign Application Priority Data

Aug. 8, 2024 (TW) ................................. 113208548

(51) Int. Cl.
*G06F 1/16* (2006.01)
*G06F 3/01* (2006.01)
*G06F 3/044* (2006.01)

(52) U.S. Cl.
CPC .......... *G06F 1/1643* (2013.01); *G06F 1/1656* (2013.01); *G06F 3/016* (2013.01); *G06F 3/044* (2013.01); *G06F 2203/04105* (2013.01)

(58) Field of Classification Search
None
See application file for complete search history.

(56) References Cited

U.S. PATENT DOCUMENTS

2022/0103054 A1* 3/2022 Takahashi ............... G06F 3/041
2024/0288943 A1* 8/2024 Rohaly ................ G06F 3/0304

* cited by examiner

*Primary Examiner* — Stephen T. Reed
(74) *Attorney, Agent, or Firm* — MUNCY, GEISSLER, OLDS & LOWE, P.C.

(57) ABSTRACT

A touch monitor capable of enhancing touch feedback comprises a cover, a touch module, a display module stacked and mounted on a back surface of the cover, a strength transmitting frame connected with the back surface of the cover, and a vibration module mounted on the strength transmitting frame. The strength transmitting frame comprises a platform and multiple legs, one terminal of each leg is connected with the platform, and another terminal of each leg is connected with the back surface of the cover, wherein the platform, the multiple legs, and the cover jointly form an accommodating space to accommodate the touch module and the display module, and the touch module and the display module are respectively spaced apart from the strength transmitting frame. A vibration strength generated by the vibration module is transmitted to the cover through the strength transmitting frame.

8 Claims, 6 Drawing Sheets

TOUCH MONITOR CAPABLE OF ENHANCING TOUCH FEEDBACK

CROSS REFERENCE TO RELATED APPLICATIONS

The present application claims priority to Taiwan application No. 113208548, filed on Aug. 8, 2024, the content of which is hereby incorporated by reference in its entirety.

BACKGROUND OF THE INVENTION

1. Field of the Invention

The present invention relates to a touch monitor, especially a touch monitor capable of enhancing touch feedback.

2. Description of the Related Art

With advancements of science and technology, touch technology is widely used in various fields in daily life. Referring to FIG. 6, a conventional touch monitor 90 comprises a cover 91, a touch module 92, and a display module 93 mounted on a back surface of the cover 91. A user can operate the touch module by touching a front surface of the cover 91, so that the display module 93 displays different image contents. In order to provide touch feedback when the user touches the touch monitor 90, the touch monitor 90 can be further mounted with a vibration component 94. When the user operates the touch module 92, the vibration component 94 will vibrate accordingly. A vibration strength generated by the vibration component 94 will be transmitted from the back of the touch monitor 90 to the cover 91 to provide feedback to the user's operation.

The vibration component 94 is usually mounted on a metal frame 95 on the back of the touch monitor 90, wherein the metal frame 95 is adapted to cover and protect the display module 93. Due to the position of the vibration component 94, most of the vibration strength generated by the vibration component 94 has to pass through the metal frame 95, the display module 93, and the touch module 92 before reaching the cover 91. As a result, the vibration strength reflected on the cover 91 is greatly reduced, thereby affecting the operational feedback provided to the user. On the other hand, the vibration strength generated by the vibration component 94 will cause the display module 93 and the touch module 92 to vibrate, causing the display module 93 and the touch module 92 to collide with each other to produce abnormal noise, which affects the user's experience.

SUMMARY OF THE INVENTION

A vibration component in a conventional touch monitor that can provide vibration feedback is mounted on a metal frame on the back side of the display module. A vibration strength generated by the said vibration component and transmitted to a user's hand needs to pass through many components, thus affecting vibration feedbacks received by the user. In view of this, the present invention provides a touch monitor capable of enhancing touch feedback, comprising:
  a cover;
  a touch module mounted on a back surface of the cover;
  a display module mounted on a back surface of the touch module;

a strength transmitting frame comprising a platform and multiple legs, one terminal of each leg connected with the platform, and another terminal of each leg connected with the back surface of the cover, wherein the platform, the multiple legs, and the cover jointly form an accommodating space to accommodate the touch module and the display module, and the touch module and the display module are respectively spaced apart from the strength transmitting frame; and
  a vibration module mounted on the platform, wherein a vibration strength generated by the vibration module is transmitted to the cover through the strength transmitting frame.

The touch monitor capable of enhancing touch feedback of the present invention comprises the strength transmitting frame connected between the cover and the vibration module, and the strength transmitting frame is not connected with the touch module and the display module. Compared with the prior art, the vibration strength generated by the vibration module in the present invention does not pass through the display module and the touch module so can be concentratedly transmitted to the cover (not dispersed to the display module and the touch module). Therefore, the cover receives a stronger vibration strength and can provide the user with better vibration feedback for touch control. On the other hand, the touch monitor of the present invention can reduce the display module and the touch module to vibrate with the vibration module, and reduce abnormal noise generated by the collision between the display module and the touch module.

DETAILED DESCRIPTION OF THE INVENTION

In order to understand the technical characteristics and practical effects of the present invention in detail, and accomplish them according to the content of the present invention, the detailed description is as follows with the embodiments shown in the figures.

Figure 1:
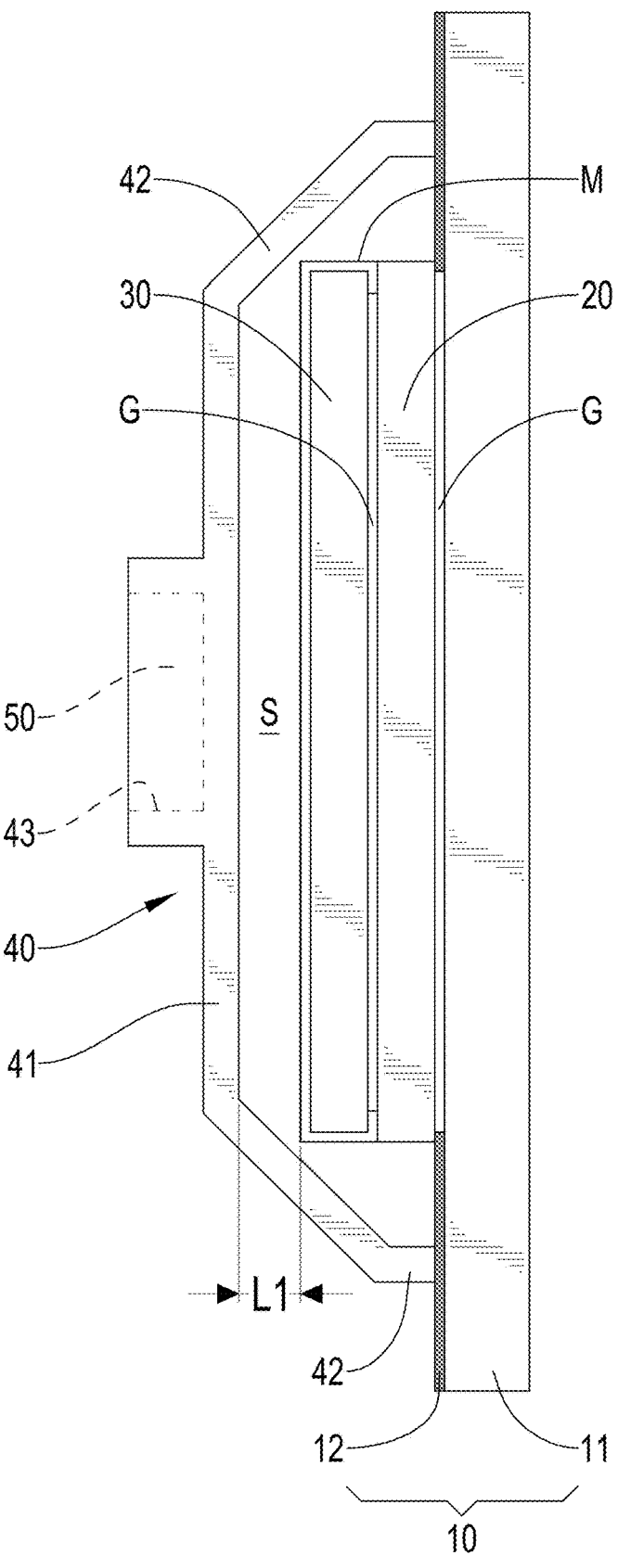
FIG. 1 is a side schematic diagram of a touch monitor capable of enhancing touch feedback of the present invention.
Figure 2:
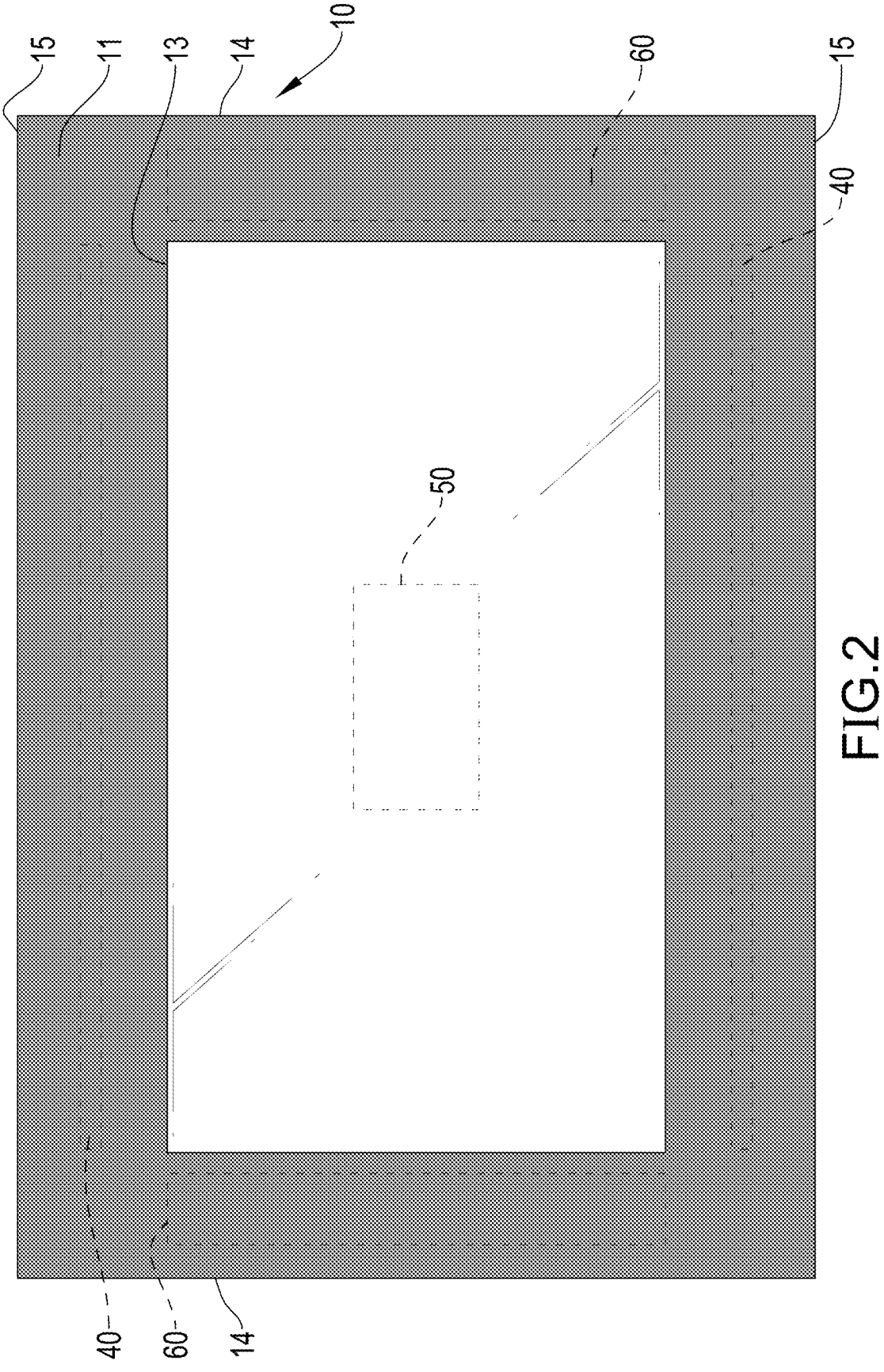
FIG. 2 is a top schematic diagram of the touch monitor capable of enhancing touch feedback of the present invention.

Referring to FIG. 1, a touch monitor capable of enhancing touch feedback of the present invention comprises a cover 10, a touch module 20, a display module 30, a strength transmitting frame 40, and a vibration module 50. A back surface of the cover 10 is mounted with the touch module 20, the display module 30, the strength transmitting frame 40 and the vibration module 50, and a front surface of the cover 10 is adapted for users to operate by touching. The cover 10 is adapted for protecting the components aforementioned. In particular, the cover 10 comprises a substrate 11 and an ink layer 12. The substrate 11 can be a transparent substrate, such as a glass substrate. The ink layer 12 is mounted around edges of the back surface of the substrate 11, so that a visible area 13 is formed in a central portion of the substrate 11 as shown in FIG. 2.

Referring to FIG. 1, the touch module 20 is mounted on the back surface of the cover 10 to detect the user's touch operations. For example, the module 20 comprises a touch substrate and a touch electrode layer. The touch substrate can also be a transparent substrate. The front surface of the touch substrate is mounted with the touch electrode layer, and the touch electrode layer is connected with the back surface of the cover 10. In particular, the touch module 20 is mounted on the back surface of the substrate 11 and corresponds to a position of the visible area 13, that is, the front surface of the touch electrode layer is connected to the back surface of the substrate 11. When users touch the front surface of the substrate 11 (the front surface of the cover 10), the touch electrode layer (the touch module) can detect touch positions of users to achieve touch operations. The touch electrode layer can be a transparent conductive film layer made of indium tin oxide (ITO), and the touch electrode layer detects the touch positions of users by self-capacitance sensing technology or mutual capacitance sensing technology.

The display module 30 is mounted on the back surface of the touch module 20 to display an image, and the display module 30 can be a thin film transistor liquid crystal display (TFT-LCD). How the display module 30 displays the image is common knowledge in the technology field. In short, the display module 30 comprises such as a liquid crystal unit, a backlight unit, and a driving unit. The back surface of the liquid crystal unit is mounted on the front surface of the backlight unit, and the back surface of the backlight unit is mounted with the driving unit. The driving unit is electrically connected with the liquid crystal unit and the backlight unit to drive the liquid crystal unit and the backlight unit to operate. The front surface of the liquid crystal unit displays the image, and the front surface is connected to the back surface of the touch module 20. Because the position of the touch module 20 corresponds to the position of the visible area 13, the image displayed by the liquid crystal unit (the display module 30) can be seen on the front surface of the substrate 11.

In an embodiment of the present invention, the back surface and sides of the display module 30 are wrapped with a metal frame M. Furthermore, an optical adhesive layer G is mounted between the touch module 20 and the cover 10, and the optical adhesive layer G can also be mounted between the touch module 20 and the display module 30. The optical adhesive layer G is adapted for connecting and fixing the aforementioned components to each other. The optical adhesive layer G can be formed by an optically clear adhesive (OCA), an optically clear resin (OCR), an ultra-violet optically clear adhesive (UV-OCA or SCA), etc.

Figure 3:
FIG. 3 is a schematic diagram of a perspective structure of a strength transmitting frame of the present invention.

Referring to FIG. 1 and FIG. 3, the strength transmitting frame 40 comprises a platform 41 and multiple legs 42. One terminal of each leg 42 is connected with the platform 41, and another terminal of each leg 42 is connected with the back surface of the cover 10. The platform 41, the multiple legs 42 and the cover 10 jointly form an accommodating space S. The touch module 20, the display module 30 and the metal M are mounted in the accommodating space S, and the touch module 20, the display module 30 and the metal frame M are respectively spaced apart from the strength transmitting frame 40. That is, the strength transmitting frame 40 does not connect with the touch module 20, the display module 30 and the metal frame M. In particular, the strength transmitting frame 40 is in an arc shape. Referring to FIG. 3, the platform 41 has a first platform side 410 and a second platform side 411 opposite to each other. The multiple legs 42 include multiple first legs 420 and multiple second legs 421. The multiple first legs 420 are connected with the first platform side 410, and the multiple second legs 421 are connected with the second platform side 411. Because each leg 42 can make the platform 41 arch relative to a bottom of each leg 42, and the multiple first legs 420 and the multiple second legs 421 are respectively connected to two opposite sides (the first platform side 410 and the second platform side 411) of the platform 41, the platform 41 can be disposed across the back surface of the touch module 20 and the display module 30 as shown in FIG. 1, wherein there is an interval L1 between the platform 41 and the back surface of the display module 30. Gaps between each first leg 420 and gaps between each second leg 421 can be adapted for heat dissipation.

In an embodiment of the present invention, the first legs 420 are arranged at spaced intervals and connected to the first platform side 410, and the second legs 421 are arranged at spaced intervals and connected to the second platform side 411. In other words, the intervals as gaps allow air to flow in and out of the accommodating space S, so that the heat generated by the operations of the touch module 20 and the display module 30 can be dissipated from the accommodating space S along with the air to achieve heat dissipation. Preferably, in the present embodiment, the platform 41 has multiple holes 412. The multiple holes 412 can increase the effects of heat dissipation. Furthermore, the terminals of the multiple legs 42 connected to the cover 10 are connected to each other to improve a structural stability of the strength transmitting frame 40.

Referring to FIG. 1, the vibration module 50 is mounted on the platform 41, and a vibration strength generated by the vibration module 50 is transmitted to the cover 10 through the strength transmitting frame 40. Specifically, referring to FIG. 3, the platform 41 is formed with an accommodating recess 43, and the vibration module 50 is mounted in the accommodating recess 43. When the vibration module 50 vibrates, the vibration strength is transmitted from the platform 41 to each leg 42. Because each leg 42 is connected with the cover 10, the vibration strength can be transmitted from each leg to the cover 10. Furthermore, the vibration module 50 can be a vibration motor mounted on a central portion of the platform 41, so that the vibration strength can be equally transmitted to each leg 42.

Figure 4:
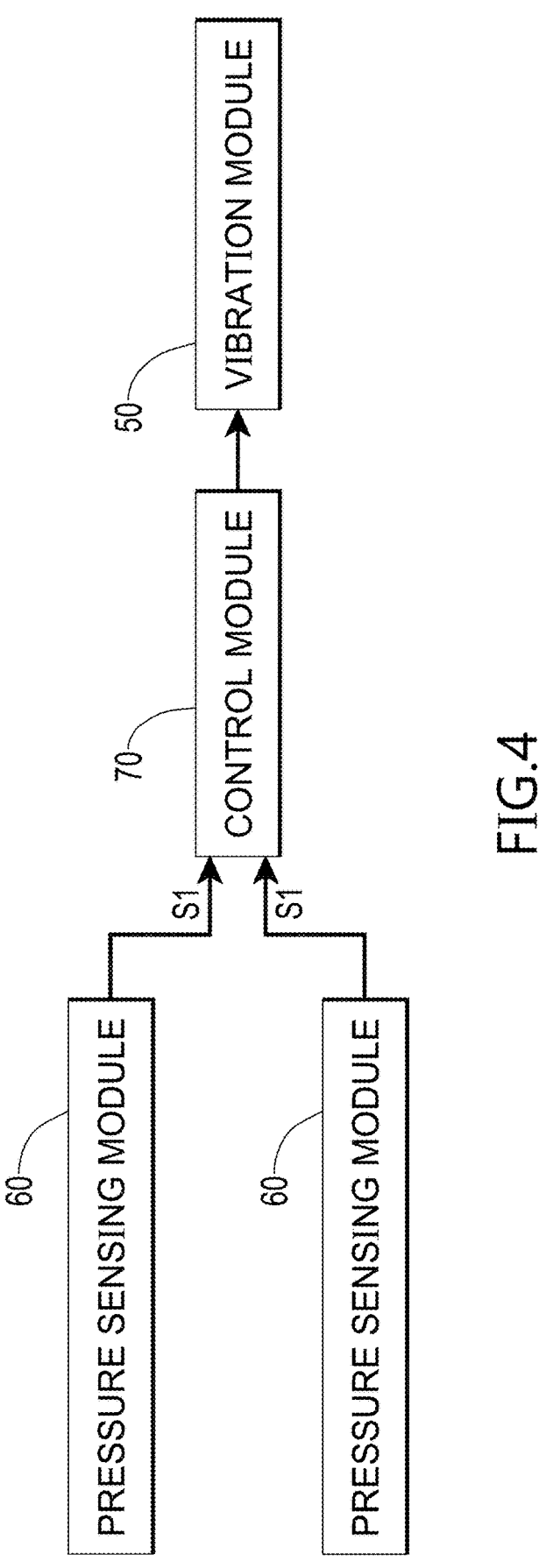
FIG. 4 is a circuit block diagram of the touch monitor capable of enhancing touch feedback of the present invention.

The operation of controlling the vibration module 50 to vibrate is described as follows. Referring to FIG. 4, the touch monitor of the present invention further comprises at least one pressure sensing module 60 and a control module. The at least one pressure sensing module 60 is mounted at the back surface of the cover 10. Each pressure sensing module 60 is adapted to detect a strength of pressing on the cover 10 to output a pressure sensing signal S1. How the pressure sensing module 60 outputs the pressure sensing signal S1 is common knowledge in the field. In short, when the user presses the cover 10, each pressure sensing module 60 will be pressed by the cover 10 and deformed. Each pressure sensing module 60 outputs the pressure sensing signal S1 of different sizes according to different deformation degrees.

In an embodiment of the present invention, the at least one pressure sensing module 60 and the multiple legs 42 of the strength transmitting frame 40 are mounted on the ink layer 12. Referring to FIG. 2, the at least one pressure sensing module 60 and the strength transmitting frame 40 are covered by the ink layer 12 and are unexposed on the front surface of the cover 10. Preferably, the cover is rectangular and has two opposite first sides 14 and two opposite second sides 15. The at least one pressure sensing module 60 comprises two pressure sensing modules 60. The two pressure sensing modules 60 are respectively mounted on the back surface of the cover 10 and adjacent to the two first sides 14, and the multiple first legs 420 and the multiple second legs 421 are respectively connected to the back surface of the cover 10 and adjacent to the two second sides 15. The said first sides 14 and the said second sides 15 are adapted to distinguish different sides of the cover 10. That is to say, the first side 14 and the second side 15 are adapted to distinguish that the at least one pressure sensing module 60 and each leg 42 are respectively mounted on different positions on the cover 10. Thereby, a length of the first side 14 can be greater than, equal to, or less than the length of the second side 15.

Referring to FIG. 4, the control module 70 is electrically connected to the at least one pressure sensing module 60 and the vibration module 50, and the control module 70 can be a circuit board mounted with controllers, memories, and other electric components. The control module 70 controls the vibration module 50 to vibrate according to a magnitude of the pressure sensing signal S1 outputted by each pressure sensing module 60. In particular, the control module 70 is preset with a pressure threshold value. The control module 70 compares the magnitude of the pressure sensing signal S1 of each pressure sensing module 60 with the magnitude of the pressure threshold value. When one of the magnitudes of the pressure sensing signal S1 of the at least one pressure sensing module 60 is greater than the pressure threshold value, the control module 70 controls the vibration module 50 to vibrate.

Figure 5:
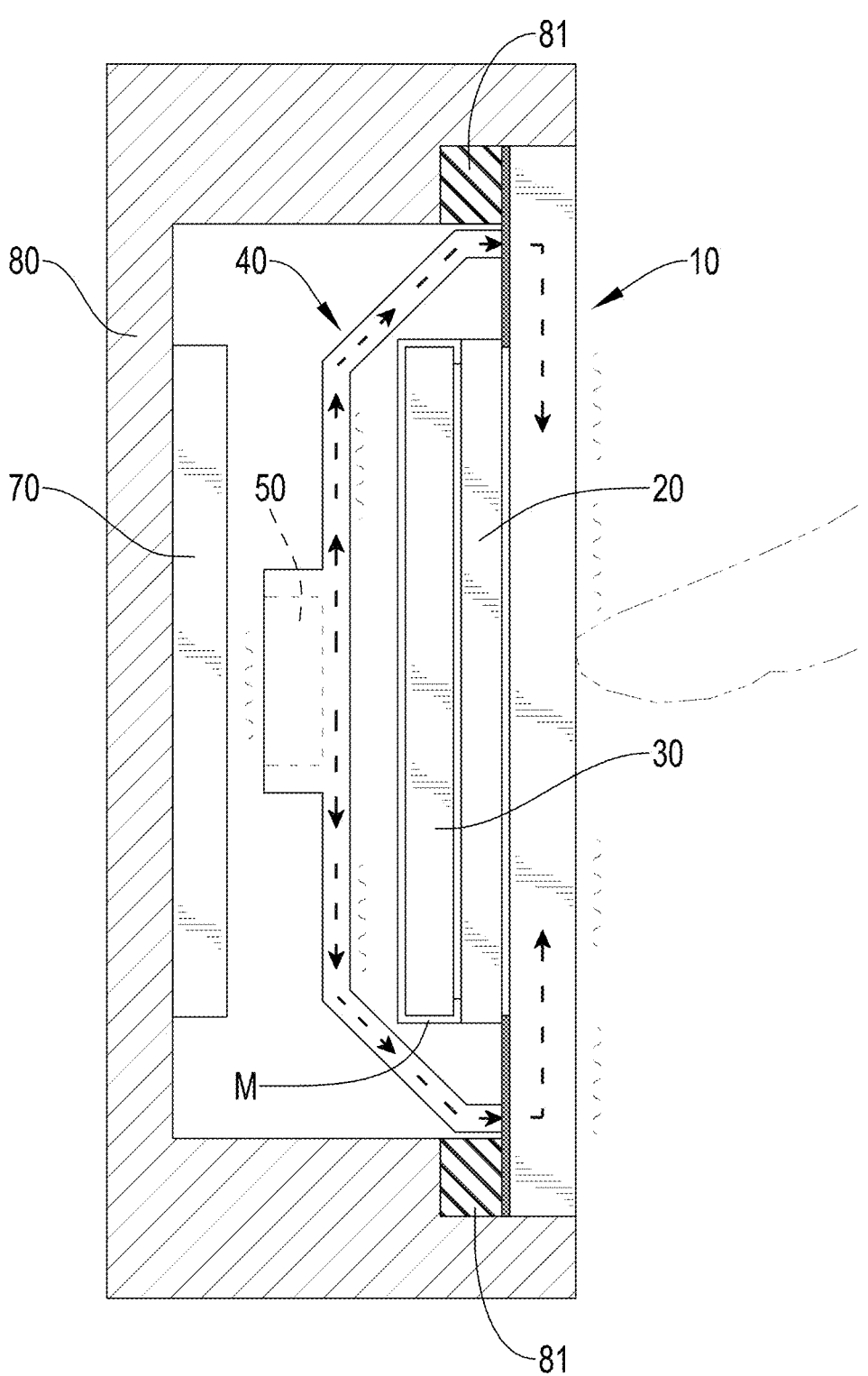
FIG. 5 is a side schematic diagram of the present invention combined with a shell.
Figure 6:
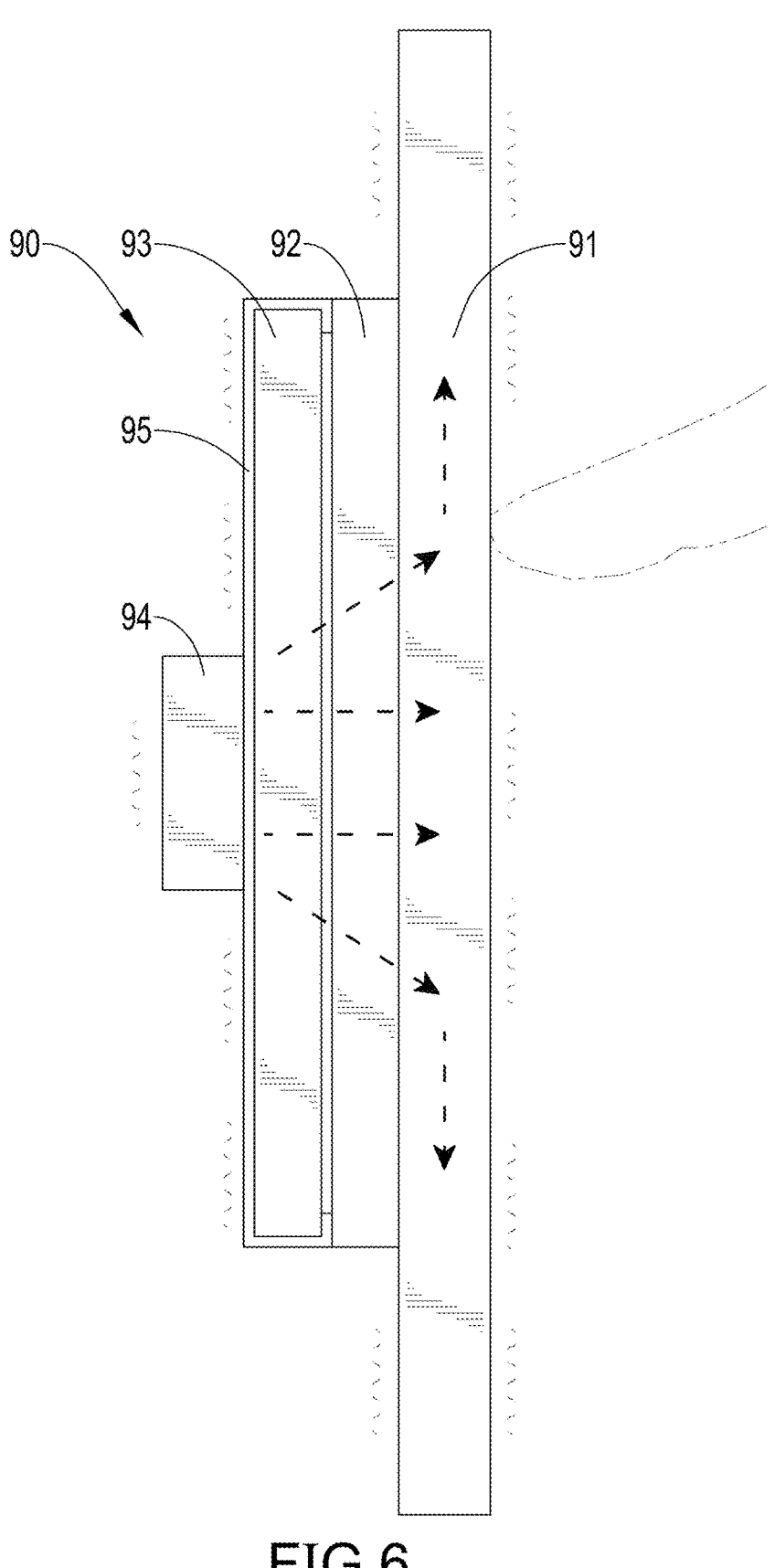
FIG. 6 is a side schematic diagram of a conventional touch monitor.

In addition, referring to FIG. 5, the touch monitor capable of enhancing touch feedback of the present invention can be assembled and combined with a shell 80 to form a touch display device. Specifically, there is a space formed inside the shell 80. The touch monitor of the present invention can be embedded into the space of the shell 80, so that the touch module 20, the display module 30, the strength transmitting frame 40, the vibration module 50, the at least one pressure sensing module 60 and the control module 70 are mounted in the space of the shell 80. Only the cover 10 is exposed outside the shell 80 for the users to perform touch operations and watch the image. Furthermore, an isolation member 81 can be mounted between the shell 80 and the cover 10, wherein the isolation member 81 is adapted to prevent water, dust and other contaminants from entering the space inside the shell 80.

The touch monitor capable of enhancing touch feedback of the present invention comprises a strength transmitting frame 40 connected between a cover 10 and a vibration module 50, and the strength transmitting frame 40 is not connected with a touch module 20 and a display module 30 of the present invention. Referring to FIG. 5, when the vibration module 50 of the present invention vibrates, a vibration strength generated by the vibration module 50 will be transmitted to the cover 10 through the strength transmitting frame 40. Compared with the prior art, the vibration strength generated by the vibration module 50 in the present invention does not pass through the display module 30 and the touch module 20 so can be concentratedly transmitted to the cover 10 (not dispersed to the display module 30 and the touch module 20). Therefore, the cover 10 receives a stronger vibration strength and can provide the user with better vibration feedback for touch control. On the other hand, the vibration strength generated by the vibration module 50 in the present invention does not pass through the display module 30 and the touch module 20, and thereby the touch monitor of the present invention can reduce the display module 30 and the touch module 20 to vibrate with the vibration module, and reduce abnormal noise generated by the collision between the display module 30 and the touch module 20.

The above only records the implementations or embodiments of the technical artifices adopted by the present invention to solve the problems, and is not configured to limit the claims of the present invention. That is, all equivalent changes and modifications that are consistent with the meaning of the claims of the present invention or made in accordance with the claims of the present invention are covered by the claims of the present invention.

What is claimed is:

1. A touch monitor capable of enhancing touch feedback, comprising:
   a cover;
   a touch module mounted on a back surface of the cover;
   a display module mounted on a back surface of the touch module;
   a strength transmitting frame comprising a platform and multiple legs, one terminal of each leg connected with the platform, and another terminal of each leg connected with the back surface of the cover, wherein the platform, the multiple legs, and the cover jointly form an accommodating space to accommodate the touch module and the display module, and the touch module and the display module are respectively spaced apart from the strength transmitting frame;
   a vibration module mounted on the platform, wherein a vibration strength generated by the vibration module is transmitted to the cover through the strength transmitting frame;
   at least one pressure sensing module mounted on the back surface of the cover, wherein each pressure sensing module is adapted to detect a strength of pressing on the cover to output a pressure sensing signal; and
   a control module electrically connected to the at least one pressure sensing module and the vibration module to control the vibration module to vibrate according to a magnitude of the pressure sensing signal outputted by each pressure sensing module.

2. The touch monitor as claimed in claim 1, wherein:
   the cover comprises a substrate and an ink layer formed around edges of the back surface of the substrate to have a visible area in a central portion of the substrate;
   the touch module is mounted on a back surface of the substrate and corresponds to a position of the visible area; and
   the at least one pressure sensing module and the multiple legs are mounted on the ink layer.

3. The touch monitor as claimed in claim 1, wherein:
   the cover has two opposite first sides and two opposite second sides;
   the at least one pressure sensing module comprises two pressure sensing modules respectively mounted on the back surface of the cover and adjacent to the two first sides; and
   the multiple legs include multiple first legs and multiple second legs, wherein the multiple first legs and multiple second legs are respectively connected to the back surface of the cover and adjacent to the two second sides.

4. The touch monitor as claimed in claim 1, wherein:

the control module is preset with a pressure threshold value; and the control module compares a magnitude of the pressure sensing signal of each pressure sensing module with the magnitude of the pressure threshold value, wherein when one of the magnitudes of the pressure sensing signal of the at least one pressure sensing module is greater than the pressure threshold value, the control module controls the vibration module to vibrate.

5. The touch monitor as claimed in claim 1, wherein the platform has multiple holes, and the terminals of the multiple legs connected to the cover are connected to each other.

6. The touch monitor as claimed in claim 1, wherein the vibration module is mounted in a central portion of the platform.

7. The touch monitor as claimed in claim 1, wherein:

the platform has a first platform side and a second platform side opposite to each other, and the multiple legs include multiple first legs and multiple second legs;

the first legs are arranged at spaced intervals and connected to the first platform side; and the second legs are arranged at spaced intervals and connected to the second platform side.

8. The touch monitor as claimed in claim 1, wherein optical adhesive layers are mounted between the touch module and the cover and between the touch module and the display module respectively.

*   *   *   *   *